UNITED STATES PATENT OFFICE.

ALFRED HUTCHINSON COWLES, OF SEWAREN, NEW JERSEY.

FERTILIZER.

1,408,169.  Specification of Letters Patent. Patented Feb. 28, 1922.

No Drawing. Original application filed September 18, 1917, Serial No. 192,028. Divided and this application filed December 21, 1918. Serial No. 267,809. Renewed May 11, 1921. Serial No. 468,729.

*To all whom it may concern:*

Be it known that I, ALFRED H. COWLES, a citizen of the United States, and resident of Sewaren, in the county of Middlesex and State of New Jersey, have invented certain new and useful Improvements in Fertilizers, of which the following is a specification.

My invention relates to fertilizers, and is a division of my application, Serial No. 192,028, filed September 10, 1917.

It consists in designedly using variable proportions of lime and hydrated silica containing more than fifteen per cent. of water of hydration obtained from di-calcium silicate to supply deficiencies of lime and soluble silica required for plant growth. Such silica containing various amounts of water are securable by the action of carbonic acid and other acids and moisture upon various simple and complex silicates, natural and artificial.

My invention further consists in the intentional addition or formation of designed proportions of such silicates in the preparation of fertilizer mixtures or substances, either by the addition of such hydrated silica or such silicates and an acid, with the intentional design of increasing or supplying intended amounts of hydrated silica to such mixtures. My invention and discovery further embodies adding to soils simple or complex calcium silicates artificially prepared, of such a quality that the carbonic acid of the soil waters will decompose said compounds or mixtures with a liberation of hydrated silica of a more soluble type than those hydrated silicas that ordinarily occur in nature as minerals. The presence of other essential fertilizers, such as potash, iron oxide, phosphoric acid and soda in said complex silicates is not to be avoided where there is sufficient allowance of calcium oxide or carbonate for the silica in the mixture, so that upon the action of carbonic acid and moisture, there shall be formed a large amount of hydrated silica by their decomposition when used.

In my invention, any silicates may be used in any manner so as to supply to the soil or fertilizer mixtures designed amounts of available added soluble silica. There are certain silicates and mixtures of silicates that can be artificially prepared that will furnish a cheap source of soluble silica. One method of producing the di-calcium silicate as a source of soluble hydrated silica is set forth in a pending application, Ser. No. 62,486, and is substantially as follows:

A mixture containing feldspar, leucite, or like silicates, natural or artificial, is sintered after being mixed with lime in such proportions that there shall be present in the mixture two molecular weight proportions of lime to one of silica, and such proportions of alkali metal oxide to alumina that there can be leached out of the sinter alkali aluminate, leaving an insoluble di-calcium silicate, plus iron oxide and a variable amount of zeolitic material. The alkali aluminate can be treated by known methods and the alkali metal oxide and alumina separated for use in their respective arts. The di-calcium silicate, before being applied as a fertilizer or fertilizer constituent, should be pulverized or reduced to a finely divided state, say to a size to pass an 80 mesh. The di-calcium silicate will have a porous nature because the alkali-aluminate has been leached away from it.

One method of preparing artificial alkali-silico-aluminate from which the di-calcium silicate can be obtained, is carried out by me on a large scale for the obtaining of alumina, for use in making the metal aluminum. Clay, salt and carbon are shaped into hollow bricks and subjected in a proper furnace to the action of vapor of water, the result being alkali-silico-aluminate bricks and hydrochloric acid. The alkali-silico-aluminate is mixed with calcium oxide, or carbonate, in such proportions that, when sintered, there shall be formed as a product insoluble di-calcium silicate and soluble alkali aluminate. The proportion of lime to silica is the same as that given above when speaking of feldspar, leucite and the like, and the alkali metal oxide and alumina are obtained in the same manner.

Magnesium carbonate found in limestone is molecularly equivalent to calcium carbonate. Magnesia (MgO) is known to act like lime in neutralizing soil acidity. It seems desirable, however, that magnesia in limestone be not too high in quantity, as its presence raises the sintering temperature.

Hydrated calcium silicate can be also produced by treating infusorial earth, best when high in water of chemical combination with slacked lime at ordinary temperatures. Infusorial earths may contain as high as thirteen per cent. of water. This reaction does not take place with ground crystalline silica. Thus, native hydrated silica may, by treating with slacked lime and water, produce calcium silicates suitable for use.

Hydrated silica containing the proper amount of water of hydration may be applied to deficient soils by adding to the fertilizer mixture di-calcium silicate containing variable percentages of alkali metal oxide and alumina after the same has been subjected to naturally occurring acids and moisture.

I have made comparative plant growth experiments using chemically equivalent calcium oxide (CaO) proportions in di-calcium silicate, calcium carbonate, calcium hydrate, calcium carbonate plus hydrated silica mixed therewith, and calcium hydrate plus hydrated silica in mixture, in soils both completely and partially devoid of lime, and found that in those cases where I was supplying hydrated silica to the soil, even as low as one quarter of a ton to the acre, such supply has greatly augmented the growth and luxuriance of nearly all the many plants submitted to comparative tests. These experiments have been performed both in pots and on plots of land, and with each plant comparative experiments have been made, and in many cases several times repeated. The aggregate result of this work has proven that silica, in soluble form is needed to make up that deficiency that exists in all soils that have been submitted to long cultivation. As said before, my di-calcium silicate is especially adapted to increase the value of fertilizers to be used on acid or neutral soils deficient in hydrated silica.

Di-calcium silicate can also be obtained by treating silicious rocks containing potash whereby the di-calcium silicate is loaded with quite a quantity of potassium aluminate, with other non-harmful impurities, and the compound substance procured is decomposable by carbonic acid and water, liberating in the soils potash, lime and silica as fertilizers. This material may also be used alone or added as a constituent to other fertilizers or fertilizer mixtures.

At the present time, soils from the decomposition of plants and manures are known to contain hydrated silica, also artificial mixtures of fertilizers, in many instances, contain it in indefinite amounts as an accidental impurity. Liebig, as early as 1840, from his investigations of the composition of the ashes of various plants, thought silica necessary as a plant food. This resulted in experiments with potassium and sodium silicates to supply silica to augment the growth of grasses, cereals and plants containing very large percentages of silica in their skeletons.

Knop and other plant physiologists, succeeded in growing plants with silica supposed to be absent as a nutriment, and afterwards, when the "Law of the minimum" was proven and accepted, silica in any form was eliminated by agricultural chemists as an essential element to use in artificial mineral fertilizers. ("Soil Conditions and Plant Growth" by E. J. Russel, 1915 Edition, pp. 30, 46, 112).

It is now universally assumed that silica, clay, zeolites and feldspars in soils, furnish a superabundance of silica and therefore its addition as a fertilizer is unnecessary. These substances and natural silicates are so minutely soluble that the assumption is unwarranted. By annual repeated growths of vegetation upon uncultivated land, hydrated double silicates, while slowly degrading to clay, furnish to soil waters soluble silica. This accumulates and is held by zeolites, vegetation and humus, and in time, an abundance of the same is in such soils and furnishes normal amounts to successive growths. Cultivation with exhaustion of humus and annual removal of crops, exhausts the soil faster than it is replenished. Figuratively, the sponge has been removed that has accumulated and retained in sufficient amount this material which forms a large part of the natural skeletons of plants. Cultivation also accelerates this loss through facilitating sub-soil drainage. Thus it is that soil water solutions in soils on cultivated lands largely free from humus, have become deficient in the quantity of soluble silica that is needed for maximum plant growth.

Many suggestions have been made involving the fusion of lime with native potash minerals such as occur in granites or potash schists and green-sand marls, with a view to render available the potash therein for fertilizer purposes. In such attempts, it was thought necessary to use potash minerals of high potash content and only sufficient lime to displace the molecular weight proportions of potassa that were in the constitution of the potash silicates therein. It is now thought that such processes are valueless. In these attempts, the product secured from, for instance, potash, feldspar and lime, the design was to lock the lime in the form of an insoluble mono-calcium-aluminum-silicate, freeing the potassa ($K_2O$) for solution. It was not realized that impure feldspars and other potash mineral silicates mixed with free silica, can be treated preferably at just their sintering temperature after mixing with two molecular weight proportions of lime to each single molecular weight proportion of silica in the mixture, and that after such treatment, the action of carbonic acid and moisture on the product, will cause the alkali aluminate necessarily formed to decompose with liberation of potassium carbonate, and also will decompose all excess of di-calcium-silicate, with the liberation of soluble calcium bicarbonate and hydrated silica. The residue left after long soil leaching, will, for example, be a calcium potassium zeolite containing in its constitution a variable fraction of a molecule of calcium oxide and a variable fraction of a molecule of potassium oxide (ammonium and other alkali metal oxides may form a part of this fraction) one molecule of alumina and ultimately two molecules of silica together with water of chemical combination, the quantity of which inversely varies to a marked degree with temperatures to which soil waters are naturally subjected. These substances are the hydrated feldspars or zeolites of nature. They are permutites, and when immersed in a mixed solution, like soil waters, they reciprocally exchange, especially alkali earth metal oxides and alkali metal oxides, inclusive of ammonia. These exchanges are governed by the laws of mass action as bearing upon the action of various ions, with variations of temperature and variations of the density of different solutes. Zeolites are recognized as valuable soil constituents.

I disclaim the use of soluble alkali metal silicates for application to the soil or to add to fertilizer mixtures as a source of supply of soluble silica. Plant growth experiments, long ago abandoned, made with them, have led plant physiologists into the error of considering the soluble types of silica as non-essential in the fertilization of plants. These old experiments failed for a chemical reason that has not been recognized in this art, namely: All soils fertilized, or not, that are suitable for plant growth, must contain calcium bi-carbonate or a salt of calcium. The action of soluble alkali silicates when in solution and brought in contact with calcium salts, leads to the formation of insoluble compounds formed of lime, alkali metal oxide and silica. When these old experiments were made, as there was always employed an excess of lime, or lime salt, above that necessary to form this insoluble product, such insoluble salts formed. Therefore, when the experimenters thought they were furnishing soluble silica to the soil water, this silica was being immediately precipitated out and so rendered non-available to their plants. The deductions drawn from their experiments were, therefore, misleading. These deductions have found their way into the literature of this art. Locking up of the silica occurs even with clay present, or with zeolites in the soil, when soluble alkali silicates are used. The silica enters into combination to replace silica that has formerly been leached away from zeolites during their slow process of degradation to clay. From these causes the old comparative plant growth experiments failed to show the value of silica hydrates. This should have been recognized from the art relating to the manufacture of artificial stone from alkali silicates or water glass and said lime compounds. Also from the work performed by Daubree, T. Sterry Hunt and others on the reaction of alkali silicates in the artificial formation of insoluble minerals.

Having thus fully described my invention and the manner in which it is to be carried out, what I claim, is:

1. The process of forming a fertilizer, which comprises heating a silicate containing potassium oxide and alumina with two molecules of lime for each molecule of silica, thereby forming a product largely decomposable by the action of water and carbonic acid with liberation of soluble hydrated silica containing more than fifteen per cent of water of hydration and adding the resulting product to fertilizers deficient in soluble silica and lime.

2. The process of increasing the amount of hydrated silica and lime that may exist in the soil, which comprises adding to a mixture of fertilizer materials di-calcium silicate adapted to be decomposed by carbonic acid and moisture into carbonate of calcium and hydrated silica containing more than fifteen per cent of water of hydration.

3. The method of supplying to deficient soils hydrated silica containing more than fifteen per cent of water of hydration, which comprises subjecting to naturally occurring acids and moisture di-calcium silicate containing variable percentages of alkali metal oxide and alumina, and adding the same to a fertilizer mixture.

4. The method of producing a fertilizer or fertilizer component, which comprises sintering silicious rocks containing potash with lime in such proportions as to form di-calcium silicate containing quite a quantity of potassium aluminate, the compound being adapted to be decomposed and liberated to the soil $CaCo_3$ and hydrated silica.

Signed at Sewaren, in the county of Middlesex and State of New Jersey, this 18 day of December, A. D. 1918.

ALFRED HUTCHINSON COWLES.

Witnesses:
ALFRED W. SCHEIDT,
MARTIN KNOESEL.